United States Patent
Oh et al.

(10) Patent No.: US 8,543,807 B2
(45) Date of Patent: Sep. 24, 2013

(54) METHOD AND APPARATUS FOR PROTECTING APPLICATION LAYER IN COMPUTER NETWORK SYSTEM

(75) Inventors: Jintae Oh, Daejeon (KR); YouRi Lee, Daejeon (KR); Yang-Seo Choi, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 600 days.

(21) Appl. No.: 12/643,100

(22) Filed: Dec. 21, 2009

(65) Prior Publication Data

US 2011/0016526 A1 Jan. 20, 2011

(30) Foreign Application Priority Data

Jul. 14, 2009 (KR) .................. 10-2009-0064015
Sep. 11, 2009 (KR) .................. 10-2009-0086063

(51) Int. Cl.
*H04L 29/06* (2006.01)

(52) U.S. Cl.
USPC ............... 713/152; 726/22; 726/23; 709/203; 709/227

(58) Field of Classification Search
USPC .............. 726/22, 23; 713/152; 709/203, 709/227
See application file for complete search history.

(56) References Cited

U.S. PATENT DOCUMENTS

| | | | |
|---|---|---|---|
| 2005/0097167 A1* | 5/2005 | Ramanathan et al. | 709/203 |
| 2006/0117386 A1* | 6/2006 | Gupta et al. | 726/23 |
| 2007/0115850 A1 | 5/2007 | Tsuchiya et al. | |
| 2007/0283436 A1* | 12/2007 | Duffield et al. | 726/23 |
| 2008/0271146 A1* | 10/2008 | Rooney et al. | 726/23 |
| 2008/0285468 A1 | 11/2008 | Seo et al. | |
| 2009/0271865 A1* | 10/2009 | Jiang | 726/23 |
| 2010/0088763 A1 | 4/2010 | Yoo | |
| 2010/0299753 A1 | 11/2010 | Yoo | |
| 2011/0238825 A1* | 9/2011 | Maffione et al. | 709/224 |

FOREIGN PATENT DOCUMENTS

| | | |
|---|---|---|
| JP | 2007-116405 | 5/2007 |
| JP | 2010-539735 | 12/2010 |
| KR | 10-0806492 | 2/2008 |
| KR | 102008002149 | 3/2008 |
| KR | 10-0858271 | 9/2008 |
| KR | 10-2008-0100918 | 11/2008 |
| KR | 10-2009-0015364 | 2/2009 |
| KR | 1020090012561 | 2/2009 |
| WO | 2008/060009 A1 | 5/2008 |

OTHER PUBLICATIONS

Deri et al., "Design and Implementation of an Anomaly Detection System: an Empirical Approach", 2003, In Proceedings of Terena Networking Conference, pp. 1-20.*

* cited by examiner

*Primary Examiner* — Brandon Hoffman
*Assistant Examiner* — Hee Song
(74) *Attorney, Agent, or Firm* — Nelson Mullins Riley & Scarborough LLP

(57) ABSTRACT

A method and apparatus for protecting an application layer in a computer network system. The method includes creating a session between a client and a data provider in response to a session connection request from the client, and determining the client as an application layer attacking client when the client generates a session termination request before the data provider transmits to the client a response packet to a data request from the client under the created session.

20 Claims, 4 Drawing Sheets

METHOD AND APPARATUS FOR PROTECTING APPLICATION LAYER IN COMPUTER NETWORK SYSTEM

CROSS-REFERENCE(S) TO RELATED APPLICATION(S)

The present invention claims priority of Korean Patent Applications No. 10-2009-0064015, filed on Jul. 14, 2009, and No. 10-2009-0086063, filed on Sep. 11, 2009, which are incorporated herein by reference.

FIELD OF THE INVENTION

The present invention relates to a technology for protecting an application layer from a Distributed Denial of Service (DDoS) attack that attacks application layers of a computer network system; and, more particularly, to a method and apparatus for protecting an application layer in a computer network system, which detect and prevent a DDoS attack.

BACKGROUND OF THE INVENTION

Various Internet services such as a web service have been available to users due to the development of communication network and electronics technologies. However, such development of communication network and electronics technologies also causes introducing various hacking tools that disturb a system providing related network services or cause the system to malfunction.

The hacking tools have been advanced to provide various types of attacks in order to gain economic profit. One of well-known hacking attacks is a Distributed Denial of Service (DDoS) attack. The DDoS attack causes a related system to malfunction not to provide a normal service. The DDoS attack has been growing stronger by abusing Botnet which is a network group of zombie personal computers (PCs).

Many DDoS detection and prevention technologies have been introduced to detect and prevent the DDoS attack. The DDoS detection and prevention technologies have been limited to detecting and blocking network level DDoS attacks such as Synchronize Sequence Number (SYN) flooding. For DDoS attacks to application layer level that disturb a web server providing an application layer service, the DDoS detection and prevention technologies reduce packets incoming to the web server by controlling a rate limit. That is, no DDoS detection and prevention technology has been introduced to directly find a DDoS attack packet or a source IP of an application layer DDoS attack and to block packets from the found source IP.

At present, the DDoS detection and prevention technologies employ a rate limit in order to detect and prevent an application layer DDoS attack. However, the rate limit results in false negative wherein some DDoS attack packets are still input to a related server and false positive wherein some user requested packets are blocked. That is, the DDoS detection and prevention technologies cannot protect a related server precisely because of the false negatives and false positives.

SUMMARY OF THE INVENTION

In view of the above, the present invention provides a method and apparatus for protecting an application layer in a computer network system, which accurately detects and prevents a Distributed Denial of Service (DDoS) attack that disturbs an application layer service such as a web service in the computer network system.

In accordance with an aspect of the present invention, there is provided a method for protecting an application layer in a computer network system, including:
creating a session between a client and a data provider in response to a session connection request from the client; and
determining the client as an application layer attacking client when the client generates a session termination request before the data provider transmits to the client a response packet to a data request from the client under the created session.

In accordance with an aspect of the present invention, there is provided an apparatus for protecting an application layer in a computer network system, including:
a data provider configured to create a session to a client in response to a session connection request from the client and transfer a data packet to the client over the network in response to a data request from the client; and
an application layer protection service server designed to detect the client as an application layer attacking client when the client generates a session termination request before the data provider transmits to the client a response packet to the data request from the client under the created session.

BRIEF DESCRIPTION OF THE DRAWINGS

The above and other objects and features of the present invention will become apparent from the following description of an embodiment given in conjunction with the accompanying drawings, in which.

DETAILED DESCRIPTION OF THE EMBODIMENTS

The present invention relates to a method for detecting and preventing a Distributed Denial of Service (DDoS) attack to an application layer of a computer network system. In order to describe the method for detecting and preventing a DDoS attack according to embodiments of the present invention, a web service will be exemplary described as one of representative application layer services.

At a host, a socket is used to write a Transmission Control Protocol/Internet Protocol (TCP/IP) communication program. The socket is an application programming interface (API) that connects a TCP/IP layer with an application layer. Some operation systems (OS) allow accessing a network layer only through a socket due to security problem. Accordingly, most programs use the socket.

In case of a TCP based program among the communication programs using a socket, it is necessary to create a session for data communication in application layer. After end of data communication, the session is terminated.

The scheme for protecting an application layer in a network according to embodiments of the present invention determines a client as a DDoS attacker when the client requests session termination within a predetermined time (or immediately after creation of the session) after the client requests data to the server, or when the client does not generate at least one ACK packet for a response packet transmitted from the server to the client because the socket of the client has already terminated the session connected between the client and the server. Then, the method of the present invention blocks the connection from the detected client to the server.

Hereinafter, embodiments of the present invention will be described in detail with reference to the accompanying drawings, which form a part hereof.

Figure 1:
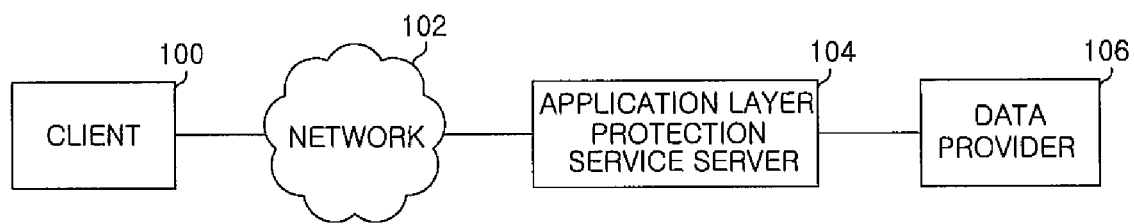
FIG. 1 is a diagram illustrating a computer network system to which embodiments of the present invention are applicable.

FIG. 1 is a diagram illustrating a computer network system to which the present invention is applied. The computer network system includes a client 100, a communication network 102, an application layer protection service server 104, and a data provider 106.

As shown in FIG. 1, the client 100 indicates a terminal at a user side that receives an application layer service by accessing the communication network 102. For example, the client 100 may be a desktop computer or a laptop computer capable of accessing the communication network 102. The client 100 is provided a data service and an application layer service through the communication network 102. Such a client 100 may be a zombie PC that disturbs the application layer service. In FIG. 1, only one client 100 is shown for convenience. However, it is obvious to those skilled in the art that a plurality of clients may be connected on the communication network 102.

The communication network 102 provides a network access environment to the client 100. For example, the communication network 102 may have an open computer network structure such as the wired and/or wireless Internet.

The application layer protection service server 104 serves to detect and prevent an attack that disturbs an application layer service such as a web service. The application layer protection service server 104 may be implemented in a form of an Intrusion Detection System (IDS), an Intrusion Prevention System (IPS), a Firewall (FW), and a web FW, or DDoS dedicated equipment.

The data provider 106 can be used to provide various TCP/IP layer services or upper layer services, for example, a Hyper Text Transfer Protocol (HTTP) service, a Telnet service, a File Transfer protocol (FTP) service, a Domain Name System (DNS) service, a Simple Mail Transfer Protocol (SMTP) service, a Simple Network Management Protocol (SNMP), a Network File Service (NFS) service, a Network Information Service (NIS) and the like. The data provider 106 provides data to the client 100 through the communication network 102. For example, the data provider 106 may be a web or content server for providing web and/or content services delivering web pages or contents to the client 100.

Although FIG. 1 illustrates the application layer protection service server 104 and the data provider 106 as two separated servers for convenience, the present invention is not limited thereto. The application layer protection service server 104 and the data provider 106 may be embodied as a single server.

The application layer protection service server 104 regards the client 100 as a DDoS attacker that attacks an application layer if the client 100 requests session termination immediately after requesting data when a session is established between the client 100 and the data provider 106 through the network 102. Accordingly, the application layer protection service server 104 protects the application layer from a DDoS attack such as Hyper Text Transfer Protocol GET flooding (HTTP GET) or Cache-Control (CC) flooding by blocking data packets requested from the client 100. Further, the application layer protection service server 104 regards the client 100 as a DDoS attacker if the client 100 dose not send at least one ACK packet for a responding packet of the server 104 because the client 100 has already issued a session termination request to terminate a session between the client 100 and the data provider 106. Then, the application layer protection service server 104 interrupts the connection between the client 100 and the data provider 106 to protect the application layer from the DDoS attack such as Hyper Text Transfer Protocol GET flooding (HTTP GET) or Cache-Control (CC) flooding. For example, the application layer protection service server 104 interrupt the connection between the data provider 106 and the client by blocking an Internet protocol (IP) address of the client 100.

Figure 2:
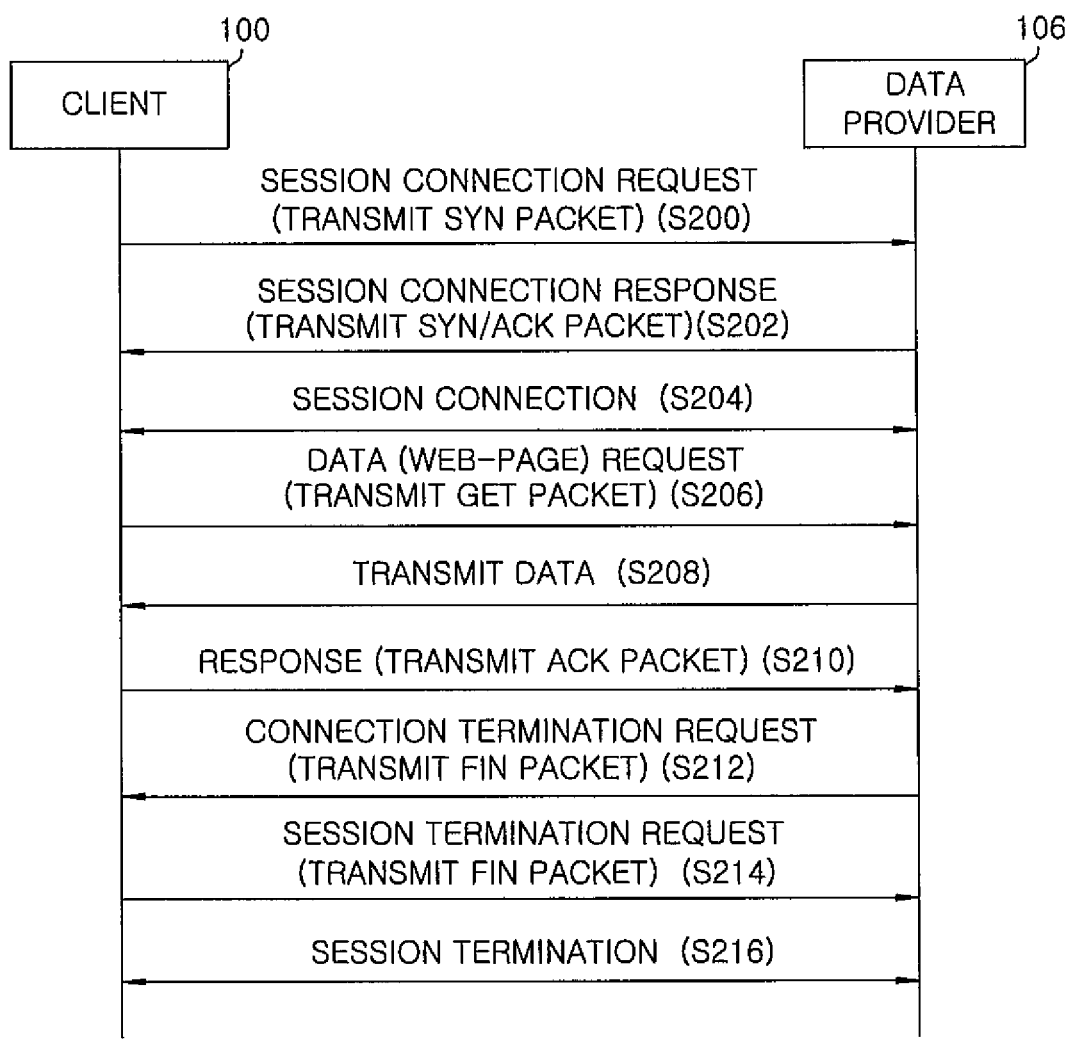
FIG. 2 is a diagram illustrating a network service in an application layer between a client and a server.

FIG. 2 is a diagram illustrating performing a network service in an application layer, which shows a procedure of performing a web service between a client 100 and a data provider 106.

At step S200, the client 100 requests session connection to the data provider 106 for requesting a web service. For example, the client 100 transmits a SYN packet to the data provider 106 in order to request the session connection. When the data provider 106 has available resources, the data provider 106 transmits a response to the session connection request from the client 100 at step S202. For example, the data provider 106 transmits a (SYN+ACK) packet as session connection response. When the client 100 receives the SYN+ACK packet, the client 100 transmits an ACK packet to the data provider 106. As a result, a session is connected between the client 100 and the data provider 106 at step S204.

At step S206, the client 100 requests data such as a web page to the data provider 106 after the session is connected between the client 100 and the data provider 106.

In order to request the data, the client 100 transmits a GET packet to the data provider 106.

After the data provider 106 receives the GET packet, the data provider 106 transmits the requested data to the client 100 at step S208.

At step S210, the client 100 responds receiving of the requested data to the data provider 106 after the client 100 receives the requested data from the data provider 106. For example, the client 100 transmits an ACK packet to the data provider 106 as the response of receiving data.

After the data provider 106 transmits all requested data, the data provider 106 requests connection end at step S212. For example, the data provider 106 transmits a finish (FIN) packet to the client 100 in order to request the connection end.

The data provider 106 may transmit the FIN packet right after transmitting the last data or with the last data when the data provider 106 turns off a keep alive value. The data provider 106 may transmit the FIN packet to the client 100 when a keep alive time of the data provider 106 is exceeded if the data provider 106 turns on the keep alive value. The client 100 transmits the FIN packet to the data provider 106 to request session termination at step S214. The session between the client 100 and the data provider 106 is terminated by the reset packet (RST).

Figure 3:
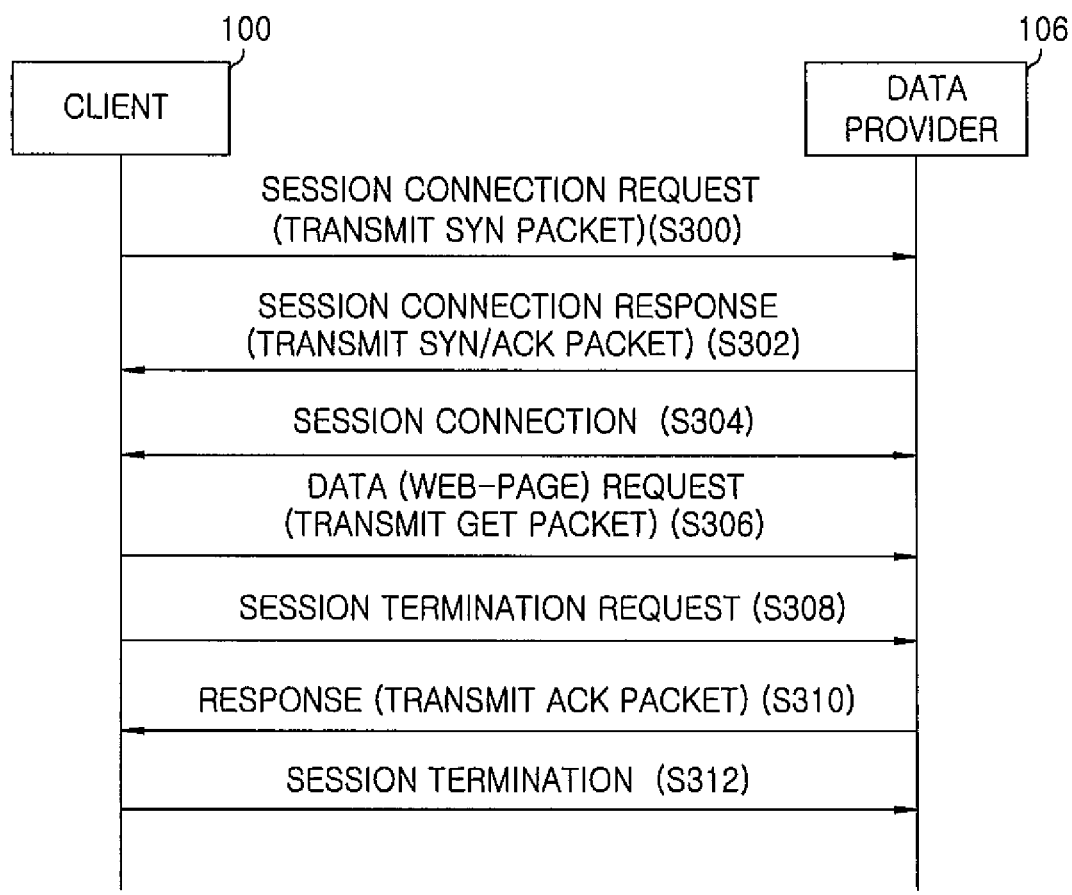
FIG. 3 is a diagram illustrating operation of a DDoS attack.

FIG. 3 is a diagram illustrating characteristics of traffic generated by a DDoS attack tool such as Netbot.

At step S300, the client 100 requests a session connection to the data provider 106 in order to request a service. In order to request the session connection, the client 100 may transmit a synchronization (SYN) packet to the data provider 106. When the data provider 106 has available resource, the data provider 106 sends a response to the session connection request from the client 100 at step S302. For example, the data provider 106 transmits a (SYN+ACK) packet to the client 100 as a response to the session connection request. After the client 100 receives the (SYN+ACK) packet, the client 100 transmits an ACK packet to the data provider 106 and a session is connected between the client 100 and the data provider 106 at step S304.

After the session between the client 100 and the data provider 106 is created, the client 100 requests data such as web pages to the data provider 106 at step S306. In order to request such data, the client 100 transmits a GET packet to the data provider 106.

The above steps are identical to those steps of providing a normal web service between the client 100 and the data provider 106. However, in case of an application layer attack, the client 100 immediately requests session termination by generating a FIN packet at step S308.

Accordingly, in case where the session termination request of the client 100 is generated between a data service request of the client 100 at the step S306 and a response packet transmission of the data provider 106 at the step S310, the data provider 106 generates a response packet as a response for the GET packet from the client 100 and transmits the generated response packet to the client 100 at step S310 and terminates the session by generating a reset (RST) packet at step S312.

The above process may be interpreted as follows.

Since the Bonet is written as a socket program, it is necessary to terminate a session after requesting a service in order to make a large number of application layer service requests. That is, a session is terminated right after requesting a service not to exhaust socket resources. Only by this way, it is possible to continuously generate packets. For example, if new sessions are continuously created without generating a FIN packet in the step S308, it is impossible to maintain communication between a server and a client because the socket resources of the client become exhausted.

Accordingly, it is necessary to terminate a session to continuously generate an attack packet due to the above issues. Since an attacker is not interested in data from the server, the attacker does not need to receive the data from the server. If a session normally maintains as shown in FIG. 2, the attacker cannot generate new sessions and packets as many as the attacker wants. Further, the attacker cannot generate packets because session termination request is delayed at step S214 due to excessive load in a server while the server is attacked. Therefore, the DDoS attacker must immediately request session termination as in step S308 of FIG. 3 because the purpose of the DDoS attacker is causing a server to malfunction.

In case of web service, a HTTP 1.0 standard describes as follows.

"In application except an experimental application program, a client must establish connection to a server before transferring a request message and terminate the connection to the server after the server transmits a response. The client and the server must be aware of that connection may be terminated by a user operation, an automatic time out, and a program error. Further, the client and the server must have capability to perform a proper operation when the connection is terminated. The termination of connection means deletion of current request although the connection is terminated by any one of or both sides."

The HTTP 1.0 standard defines normal service termination as terminating a session after a server ends data communication. The HTTP 1.0 standard defines abnormal service termination as follows:

1. Session termination by a user operation
2. Session termination by automatic time out
3. Session termination by program error Therefore, following conclusion can be made based on the characteristics of traffic shown in FIG. 3 and the definition of abnormal session termination.

As a result of examining the Netbot and a socket program, a time interval from the generation of a GET packet at S306 to the generation of a FIN packet at step S308 is very short. For example, the time interval is about several tens micro seconds (μsec). In more specific, the time interval may be about 10 to 90 microseconds (μsec). In order to maximally generate attack packets, two packets are generated within such a short interval. Here, there is a very small chance to terminate a session by the user operation. If a user wants creating a GET packet for request a web service through a web browser and generating a FIN packet immediately after creating the GET packet, the user must close the web-browser within several tens micro seconds (μsec). However, it is impossible to a user to close the web browser within such a short period of time.

In case of the session termination by the automatic time out, a time out is generally set as several seconds such as about 2 to 5 seconds. Compared with several tens microseconds (μsec), the automatic time out is very long time. Therefore, it is almost impossible to terminate the session by the automatic time out.

Finally, since the session termination by a program error can be clearly analyzed as a client program error, it is sometimes excluded from assumptions defining abnormal session termination.

In the present embodiment, therefore, if the FIN packet is generated right after the GET packet is generated as shown in FIG. 3, a client 100 is regarded as a DDoS attacker. Then, a data packet is blocked to transmit to the client 100.

Further, the GET packet of step S306 and the FIN packet of step S308 are generated within an interval of several tens microseconds (μsec), whereas a server response (ACK) packet at step S310 may be generated in several milliseconds. In the present embodiment, therefore, if the session termination request of the client 100 is generated between a data service request of the client 100 at the step S306 and a response (ACK) packet transmission of the data provider 106 at the step S310 after a session termination request of the client 100, the client 100 is regarded as an attacker. Then, the connection between the client 100 and the data provider 106 is blocked. Instead of the FIN packet, a reset (RST) packet may be used as a session termination packet at S308.

When a socket of the client 100 is active for the response of the step S310, the client 100 transmits an ACK packet to the data provider 106 in order to inform the data provider 106 that the client 100 receives the response from the data provider 106. However, in case of an attacker, a socket of the client is already terminated by the session termination request of the step S308. Therefore, the client 100 does not generate any ACK packet for the response packet of the step S310. Therefore, in the present embodiment, the client 100 may be regarded as an attacker if the client 100 does not create at least one ACK packet for the response packet from the data provider 106.

Hereinafter, a method for protecting an application layer in a network in accordance with an embodiment of the present invention will be described with a state machine of FIG. 4. In detail, a service procedure between the client 100, an application layer protection service server 104, and a data provider 106 will be described.

Figure 4:
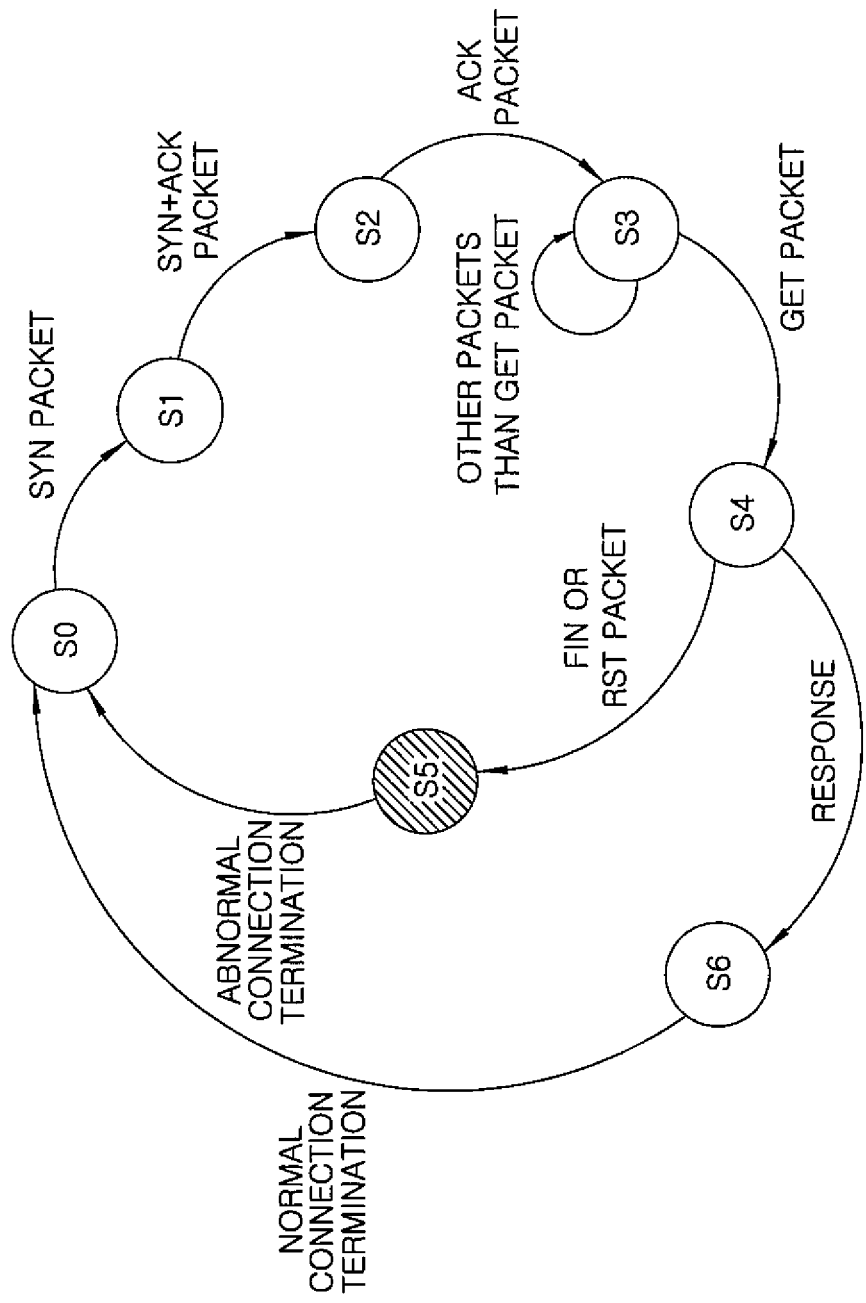
FIG. 4 is a state machine illustrating a method for protecting an application layer in a computer network system in accordance with an embodiment of the present invention.

FIG. 4 is a state machine illustrating a method for protecting an application layer in a network in accordance with an embodiment of the present invention. The state machine of FIG. 4 may be generated for each session in a web service.

A state S0 is a state of monitoring whether a client 100 requests a new session or not. When a SYN packet from the client 100 is monitored, the application layer protection service server 104 changes the state S0 to a state S1 and waits for a SYN+ACK packet of the data provider 106.

When the data provider 106 transmits the SYN+ACK packet, the application layer protection service server 104 changes the state S1 to a state S2. The client 100 changes the state S2 to a state S3 by transmitting an ACK packet and by monitoring whether a session is completely created or not.

The application layer protection service server 104 may move from the state S3 to a state S4 of detecting the first GET packet when the client 100 generates the GET packet.

At the state S4, the application layer protection service server 104 changes the current state S4 to a state S6 when a response of the data provider 106 is monitored at first and returns to the state S0 again of a normal connection termination.

The client 100 and the data provider 106 exchange a lot of packets while the state S6 is changed to the state S0. Since it is not directly related to the present embodiment, the exchanging packets between the client 100 and the data provider 106 will not be described.

At the state S4 again, the application layer protection service server 104 determines the client 100 as an application layer attacking client if the client 100 generates the FIN packet or the RST packet. The application layer protection service server 104 changes the state S4 to the state S5 for performing corresponding operation for dealing with the attack. That is, the application layer protection service server 104 immediately blocks connection to or from the IP address of the corresponding client or transfers the IP address of the corresponding client to IPS and FW.

Although the client 100 and the data provider 106 exchange packets several times while the state S5 is changed to the state S0, those procedures are not directly related to the method of the present invention. Therefore, detailed description thereof will be omitted.

When the client 100 transfers other packets rather than the GET packet at the state S3, the state S3 may be maintained. When connection is terminated, the current state may be changed to the state S0.

Connection may be normally or abnormally terminated by a protocol in the states S1, S2, S3, S4, S5, and S6 except the state S0. Since it is not directly related to the method of protecting an application layer in network according to the present invention. Therefore, detail description thereof is omitted.

The method for detecting and preventing a DDoS attack to an application layer has been described based on HTTP by way of an example. A client who requests a service and session termination at the same time after establishing a session does not also refer a response for the service request in other application programs, and thus such a client can be determined as a DDoS attacker. Particularly, a server terminates a session right after receiving one GET packet in one session when the server turns off a keep-alive option. Therefore, it is possible to further effectively protect a server from an attack.

As described above, the method according to the embodiments of the present invention finds an IP address of an attacker and blocks packets from the IP address of the attacker or blocks a GET packet that followed by a FIN packet in a very short period of time. Further, the method according to the present embodiment may terminate a session using a RST packet instead of using a FIN packet.

The method of the present invention detects an IP address of an attacker that generates a FIN packet right after generating a GET packet, which is the characteristic of an attacker shown in FIG. 3. Therefore, the method of the present invention can perform proper operation to cope with the DDoS attacker without generating false alarm. A DDoS detection and protection method according to the related art uses a lot of resources to control a rate limit. However, since the method of the present invention directly finds and deals with an attacker generating an application layer DDoS packet, the method of the present invention does not waste resources. Further, the method of the present invention can find an attacker based on whether an ACK packet is generated by a client as a response of server or not. Moreover, the method of the present invention can properly deal with attack packets although normal users and zombie PCs are included together in a network using network address translation (NAT) by determining whether a FIN packet follows by a GET packet.

While the invention has been shown and described with respect to the embodiment, it will be understood by those skilled in the art that various changes and modifications may be made without departing from the scope of the invention as defined in the following claims.

What is claimed is:

1. A method for protecting an application layer in a computer network system, comprising:
   creating a session between a client and a data provider in response to a session connection request from the client; and
   determining the client as an application layer attacking client when the client generates a session termination request before the data provider transmits to the client a response packet to a data request from the client under the created session,
   wherein the client is regarded as an attacker when the session termination request is generated between a data service request and a response (ACK) packet transmission.

2. The method of claim 1, further comprising:
   determining the client as the application layer attacking client when the client does not generate an ACK packet to the response packet transmitted from the data provider to the client in response to the data request from the client.

3. The method of claim 1, wherein the application layer attacking client is a client for executing a Distributed Denial of Service (DDoS) attack.

4. The method of claim 3, wherein the DDoS attack includes a Hyper Text Transfer Protocol (HTTP) GET flooding attack and a Cache-Control (CC) flooding attack type.

5. The method of claim 1, further comprising:
   blocking connection of the client with the data provider when the client generates a session termination request before the data provider transmits to the client a response packet to a data request from the client under the created session.

6. The method of claim 2, further comprising:
   blocking connection of the client with the data provider when the client does not generate an acknowledgement (ACK) packet to the response packet transmitted from the data provider to the client in response to the data request from the client.

7. The method of claim 1, wherein the data request from the client includes transmitting a GET packet to the data provider.

8. The method of claim 1, wherein the session termination request of the client includes transmitting either a finish (FIN) packet or a reset (RST) packet to the data provider.

9. The method of claim 1, wherein the computer network system is a Transmission Control Protocol/Internet Protocol (TCP/IP) based system.

10. The method of claim 1, wherein the client is determined as an application layer attacking client when a FIN packet is generated within a predetermined time interval from a GET packet.

11. An apparatus for protecting an application layer in a computer network system, comprising:
 a data provider configured to create a session to a client in response to a session connection request from the client and transfer a data packet to the client over the network in response to a data request from the client; and
 an application layer protection service server designed to detect the client as an application layer attacking client when the client generates a session termination request before the data provider transmits to the client a response packet to the data request from the client under the created session,
 wherein the client is regarded as an attacker when the session termination request is generated between a data service request and a response (ACK) packet transmission.

12. The apparatus of claim 11, wherein the application layer attacking client is a client for executing a Distributed Denial of Service (DDoS) attack.

13. The apparatus of claim 12, wherein the DDoS attack includes a Hyper Text Transfer Protocol (HTTP) GET flooding attack and a Cache-Control (CC) flooding attack.

14. The apparatus of claim 11, wherein the application layer protection service server is further configured to determine the client as the application layer attacking client when the client does not generate an ACK packet to the response packet transmitted from the data provider to the client in response to the data request from the client.

15. The apparatus of claim 11, wherein the application layer protection service server is further configured to block connection of the client with the data provider when the client generates a session termination request before the data provider transmits to the client a response packet to a data request from the client under the created session.

16. The apparatus of claim 14, wherein the application layer protection service server is further configured to block connection of the client with the data provider when the client does not generate an acknowledgement (ACK) packet to the response packet transmitted from the data provider to the client in response to the data request from the client.

17. The apparatus of claim 11, wherein the data request of the client is performed by transmitting a GET packet to the server.

18. The apparatus of claim 11, wherein the session termination request of the client is performed by transmitting either a finish (FIN) packet or a reset (RST) packet to the server.

19. The apparatus of claim 11, wherein the system is a Transmission Control Protocol/Internet Protocol (TCP/IP) based system.

20. The apparatus of claim 11, wherein the client is determined as an application layer attacking client when a FIN packet is generated within a predetermined time interval from a GET packet.

* * * * *